(12) United States Patent
Slifkin et al.

(10) Patent No.: US 8,969,745 B2
(45) Date of Patent: Mar. 3, 2015

(54) RAILCAR WEIGHING SYSTEM WITH OFFSET SENSOR

(75) Inventors: Timothy P. Slifkin, Morristown, NJ (US); Herbert Perten, Suffern, NY (US)

(73) Assignee: Startrak Information Technologies, LLC, Rochelle Park, NJ (US)

( * ) Notice: Subject to any disclaimer, the term of this patent is extended or adjusted under 35 U.S.C. 154(b) by 310 days.

(21) Appl. No.: 13/417,788

(22) Filed: Mar. 12, 2012

(65) Prior Publication Data

US 2012/0228038 A1 Sep. 13, 2012

Related U.S. Application Data

(63) Continuation of application No. 12/836,567, filed on Jul. 14, 2010, now Pat. No. 8,227,713, which is a continuation of application No. 12/098,403, filed on Apr. 4, 2008, now abandoned.

(60) Provisional application No. 60/912,686, filed on Apr. 18, 2007, provisional application No. 60/910,087, filed on Apr. 4, 2007.

(51) Int. Cl.
 *G01G 19/04* (2006.01)
 *G01G 23/01* (2006.01)
 *G01G 23/37* (2006.01)
(52) U.S. Cl.
 CPC ............ *G01G 23/3735* (2013.01); *G01G 23/01* (2013.01); *G01G 19/042* (2013.01)
 USPC ........................................................ 177/163

(58) Field of Classification Search
 CPC ............................ G01G 19/042; G01G 23/01
 USPC ................... 177/136, 137, 163, 211; 702/174
 See application file for complete search history.

(56) References Cited

U.S. PATENT DOCUMENTS

| | | | |
|---|---|---|---|
| 2,478,720 A | 8/1949 | Sourwine et al. | |
| 3,587,760 A | 6/1971 | Linz et al. | |
| 4,310,767 A | 1/1982 | Peacock | |
| 4,773,493 A | 9/1988 | Goodier | |
| 4,831,539 A | 5/1989 | Hagenbuch | |
| 4,947,694 A | 8/1990 | Kirman et al. | |
| 5,205,368 A | 4/1993 | Hafner | |
| 5,230,392 A | 7/1993 | Tremblay | |
| 5,327,347 A | 7/1994 | Hagenbuch | |
| 5,528,499 A | 6/1996 | Hagenbuch | |
| 6,209,382 B1 * | 4/2001 | Komata et al. | 73/1.13 |
| 6,263,265 B1 | 7/2001 | Fera | |
| 6,313,414 B1 | 11/2001 | Campbell | |
| 6,323,441 B1 | 11/2001 | Hager et al. | |
| 6,441,324 B1 | 8/2002 | Stimpson | |
| 6,983,883 B2 | 1/2006 | Ridling | |
| 7,129,425 B2 | 10/2006 | Carr et al. | |
| 8,258,414 B2 * | 9/2012 | Toms | 177/136 |

* cited by examiner

*Primary Examiner* — Randy W Gibson
(74) *Attorney, Agent, or Firm* — Drinker Biddle & Reath LLP

(57) ABSTRACT

One or more sensors mounted on a railcar sense the effect of weight of the railcar and transmit the data, for example via a communication link, to a user for storage and feedback where needed. In one embodiment the sensors are mounted on one or more rail trucks that carry the car body.

19 Claims, 7 Drawing Sheets

FIG. 6
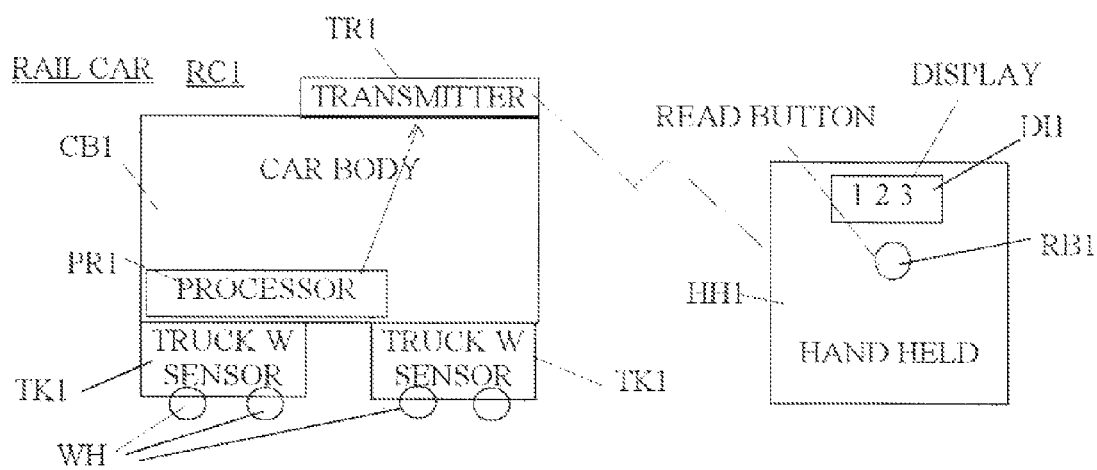
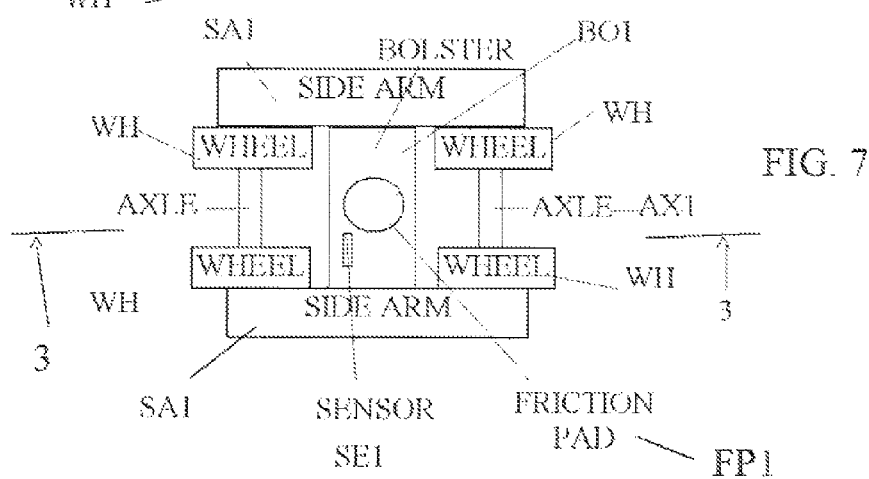
FIG. 7

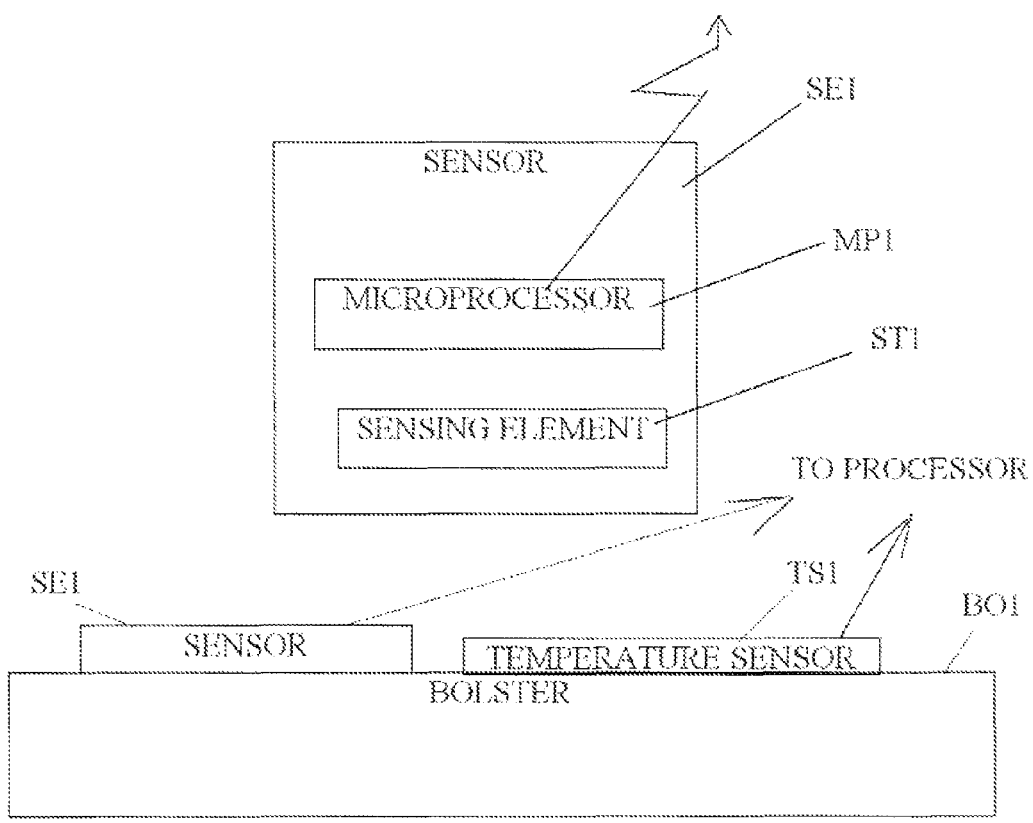

US 8,969,745 B2

RAILCAR WEIGHING SYSTEM WITH OFFSET SENSOR

RELATED APPLICATIONS

This is a Continuation of U.S. application Ser. No. 12/836,567 filed 14 Jul. 2010, which is a continuation of U.S. application Ser. No. 12/098,403 filed 4 Apr. 2008. This application also relates to U.S. application No. 60/910,087 filed 4 Apr. 2007, and U.S. application No. 60/912,686 filed 18 Apr. 2007. Applicant claims priority benefits of all these applications, and all of these applications are incorporated by reference as if fully set forth herein.

FIELD OF THE INVENTION

This invention relates to weighing of railcars before they are inserted into a train.

BACKGROUND OF THE INVENTION

Several reasons exist for knowing a railcar's weight before it is inserted into a train, namely for billing purposes when product is sold by weight (Custody Transfer), to track total weight of the railcar (the consist) so appropriate locomotive power can be scheduled to pull the train appropriately, and to ascertain the loaded status of the railcar while at destination facility being unloaded.

Currently, in order to capture weight after loading, railcars are pulled by a switcher engine to a permanent Weigh Bridge, generally somewhere on the customer's facility. The information is then keyed into the operator's database and sent to the appropriate location.

An object of the invention is to improve systems for weighing railcars.

SUMMARY OF EMBODIMENTS OF THE INVENTION

An embodiment of the invention involves mounting a sensor on each of one or more railcars to measure the weight.

Another embodiment of the invention involves mounting one or more sensors on each of one or more railcars and transmitting the output of the sensor to a central office.

Another embodiment involves mounting the sensor on a "truck" of the railcar to weigh the car body.

Another embodiment involves mounting the sensor on each of one or more railcars and reading the output locally on a display mounted on the railcar.

Another embodiment involves mounting the sensor an each of one or more railcars and reading the output from a fixed or handheld reader located close to the railcar.

The various features of novelty that characterize the invention are pointed out in the claims. Other objects and advantages of the invention will become evident from the following detailed description of preferred embodiments when read in light of the accompanying drawings.

BRIEF DESCRIPTION OF THE DRAWINGS

FIG. 6 is a schematic illustration of an embodiment of the invention using a hand held display.
FIG. 7 is a schematic illustration of an embodiment of the invention showing the sensor positioned at another location.
FIG. 11 is a schematic illustration of an embodiment of the invention showing a sensor incorporating a microprocessor.
FIG. 12 is a schematic illustration of an embodiment of the invention showing a temperature sensor.

DETAILED DESCRIPTION OF PREFERRED EMBODIMENTS

Figure 1:
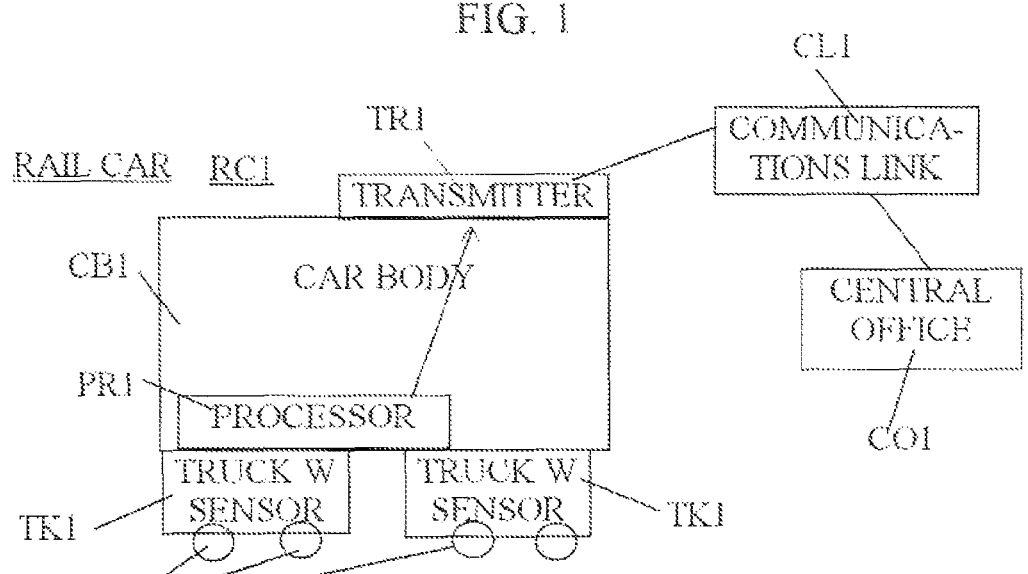
FIG. 1 is a schematic illustration of an embodiment of the invention.
Figure 2:
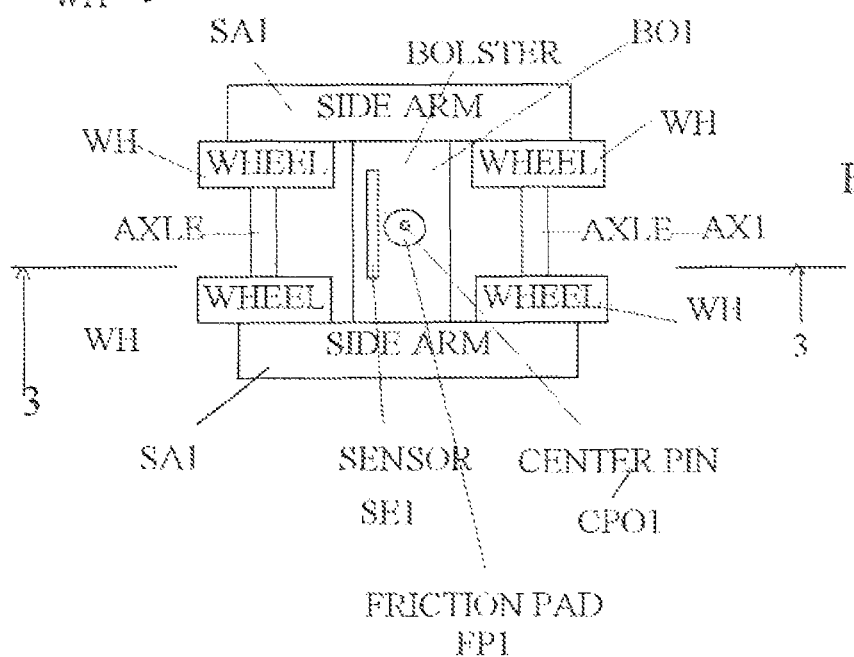
FIG. 2 is a schematic illustration of a detail of the embodiment in FIG. 1.
Figure 3:
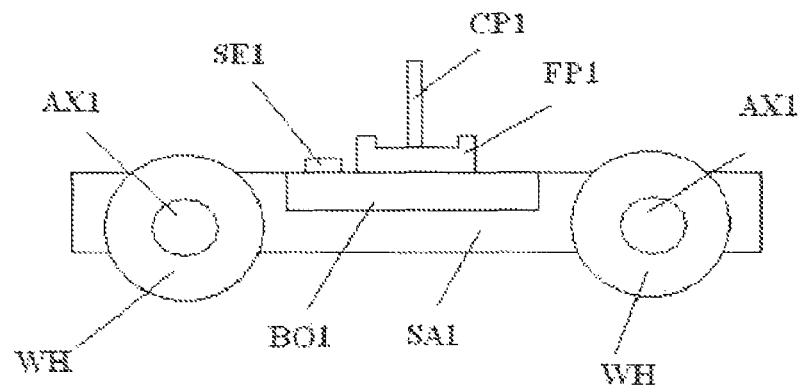
FIG. 3 is a section 3-3 of the embodiment in FIG. 2.

In FIGS. 1 to 3, a railcar RC includes a car body CB1 that is supported at each end by a truck assembly or truck TK1. The latter includes wheels WH, axles AX1, side arms SA1, and friction pad GP1. This assembly is commonly known as the "truck". The wheels WH rotate on the axles AX1 that support the side arms SA1. A bolster BO1 in the form of a steel beam spans and holds each side-arm/wheel set. A friction pad FP1 with a raised annular outer ring in the center of each bolster BO1 engages a matching friction pad on the car body CB1 to support the car body. Typically a center pin in the center of the friction pad FP1 enters an opening in the car body CB1, or a center pin in the car body enters an opening in the friction pad FP1, allows the car body CB1 to swivel on the truck TK1 and keeps it in place horizontally through the rail car's operation, especially during turns.

In FIG. 1, the "trucks" TK1 hold sensors SE1 to weigh the car body CB1. A processor PR1 on the car body analyzes the outputs of the sensors SE1 and a transmitter TR1 coupled to the processor transmits the processor output via a communications link CL1 to a central office CO1.

Figure 4:
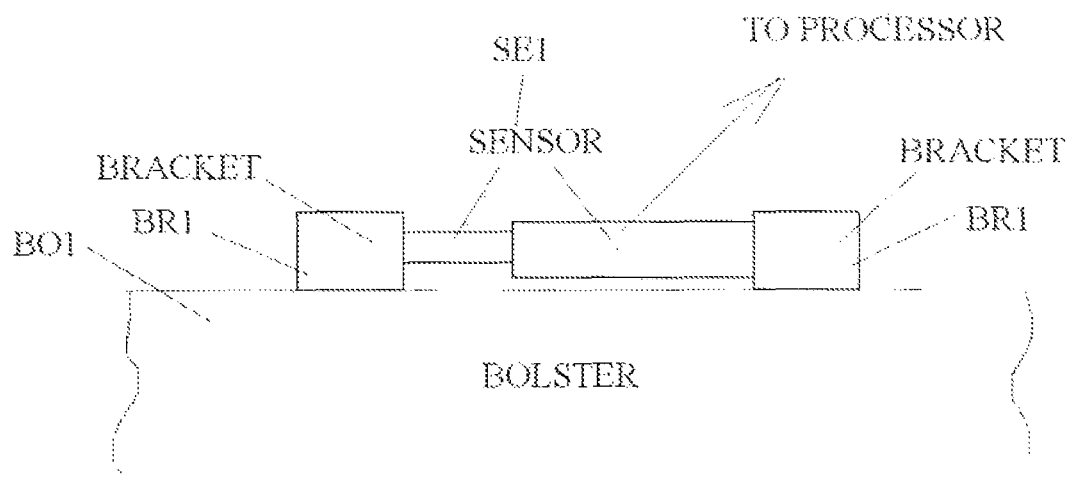
FIG. 4 is a detail of a sensor of FIGS. 1, 2, and 3.

Details of the trucks TK1 appear in FIGS. 2, 3 and 4. Here, wheels WH rotate on axles AX1 that also support side arms SA1. A bolster BO1 connects the side arms SA1 and forms the friction pad FP1. The truck TK1 can swivel about the center pin CP1. A pair of brackets BR1 support a sensor SE1 on the bolster BO1 that connects the side arms SA1.

When the car body CB1 is mounted on the two friction pads FP1 of the two trucks TK1, the weight of car body flexes the bolster BO1 in each truck, thereby applying a horizontal force to the brackets BR1 and changing the length of the sensor. The resulting change in the sensor SE1 is transmitted to the processor PR1, which analyzes the result to produce data reflecting the weight of the car body CB1. The transmitter TR1 in turn sends the information, via the communication link CL1 to the central Office CO1. In an embodiment of the invention sensors SE1 are mounted on a crossbeam of the car body that rests on the truck TK1 in addition to or in place of the truck mounted sensor. Such a crossbeam mounted sensor measures deflection of the crossbeam as a magnitude of the weight.

Figure 5:
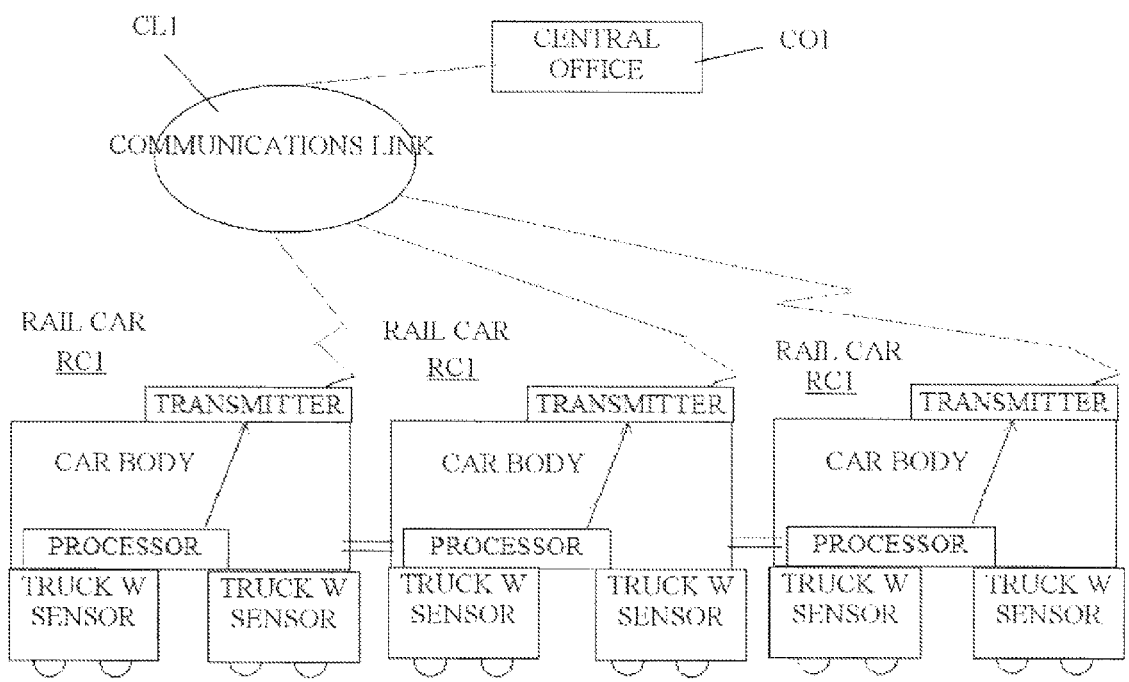
FIG. 5 is a schematic illustration of an embodiment of the invention in a train of railcars.

In FIG. 5 a number of railcars RC1 coupled to each other form a train. Each railcar RC1 transmits its data via the communications link CL1 to the central office CO1.

Thus a set of sensors SE1 mounted on the railcars RC1 at appropriate locations are connected (via wire and/or wireless link) to a processor PR1 in a microprocessor system which determines the weight of the lading. All required equipment is mounted (temporarily or permanently) on the railcar RC1 so that a weight may be captured at will. A weighing procedure may be initiated under local processor control—i.e. at scheduled times, or upon crossing defined geographical partitions, or when unloading begins, etc. or when other locally defined events occur. Also, a user may "Poll" the railcar to get a reading as required for inventory or status purposes.

According to one embodiment, the processor PR1 is initialized by creating a data base of weights for the car body CB1, starting by weighing the empty car body CB1 and setting the output of the sensors SE1, SE2, and/or SE3 into the data base of the processor at a base zero. The initialization continues by adding incremental weights the car body CB1 and setting each output of the sensors SE1, SE2, and/or SE3 into the data base at a value indicating the added incremental weight. Repeatedly adding incremental weights to the car body CB1 and setting values into the processor PR1 corresponding to the resulting total added weight, until a maximum weight is placed in or on the car body, produces a data base against which any sensor output indicates the load within the car body.

Once taken, the measured weight (Weighment) is sent back over the communications link CL1 link to the central office CO1 of a user for examination, evaluation, or transmission to his data base system.

Once manufactured, the weight of a railcar structure is substantially fixed. This is particularly true of the railcar body CB1 itself. (On the truck, the wheels may wear and lose material and weight, as may the brakes and some of the running gear. The railcar body CB1 however, remains very constant.) Thus, the only thing that can effectively change the weight of the railcar body CB1 is the load placed into it.

The entire weight of the railcar body CB1 (including the lading) is suspended between each of the two bolsters BO1, and the bolsters are in turn suspended across the two side arms SA1. Each bolster BO1 is a steel beam structure with known dimension and construction.

Thus, the weight of the entire railcar body and lading is balanced at each end on the center point of a steel beam bolster BO1 that is in turn suspended between each set of side-arms SA1. Hence, the bolsters effectively constitute large steel springs with small, but highly repeatable flex conditions under load. As the weight of the railcar body increases (via increased weight of the lading) so does the flex of each of the bolsters BO1. The flex of the bolsters stays well within the elastic region of the structure, thus, the relationship of weight change in the railcar body to flex is highly repeatable As weight increases (through loading the car), the bolster BO1 center point flexes down. As this occurs, the bottom of the bolster will "stretch" while the top of the bolster will compress. Depending on actual structure, both the top and the bottom of the bolster may stretch but the top of the bolster will stretch more than the bottom. In any case however, they will react differently, but with high repeatability.

According to an embodiment of the invention each sensor SE1 mounted on or in the bolster BO1 accurately measures this flex (at either the top or bottom of the beam), and properly calibrating the devices against weight, produces an accurate method of measuring the weight of the railcar body CB1 and the lading. An embodiment of the invention involves calibrating the flex with an empty car body. In this way one can effectively "tare out" the fixed weight of the railcar structure. Thus, only the changing weight of the lading will affect the flex of the bolsters BO1.

In the embodiment shown in FIG. 6, the transmitter TR1 in the rail car RC1 transmits the data from the processor PR1 directly to a hand held device HH1 in the vicinity or in the rail car. A read button RB1 on the hand held device HH1 allows an observer to read data in a display DI1. Other components of the rail car RC1 remain the same as in FIG. 1.

In the embodiment shown in FIG. 7, the components remain the same as in FIG. 2 except that the sensor SE1 is positioned off center on the bolster BO1.

Figure 8:
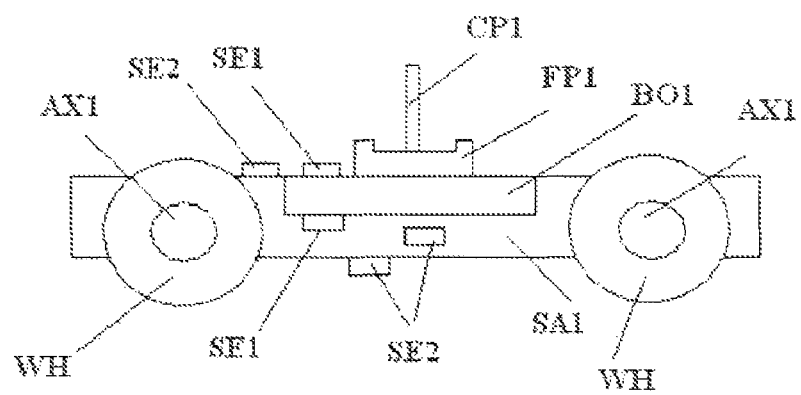
FIG. 8 is a schematic illustration of an embodiment of the invention showing sensors at a number of critical locations.

The embodiment of FIG. 8, illustrates the truck TK1 whose components remain the same as in FIG. 3 except that a number of the sensor SE1 and SE2 are mounted on several locations both on the bolster BO1 and the side arms SA1. The sensors SE1 and SE2 are identical. However the sensors SE1 are shown in end views while views of sensors SE2 appear a side views. Their respective orientations serve to detect flexes arising from the weight of the car body CB2. One embodiment of the invention utilizes only one of the sensors SE1 or SE2 and another embodiment the outputs of two or more of the sensors are combined to produce a weight measurement.

Figure 9:
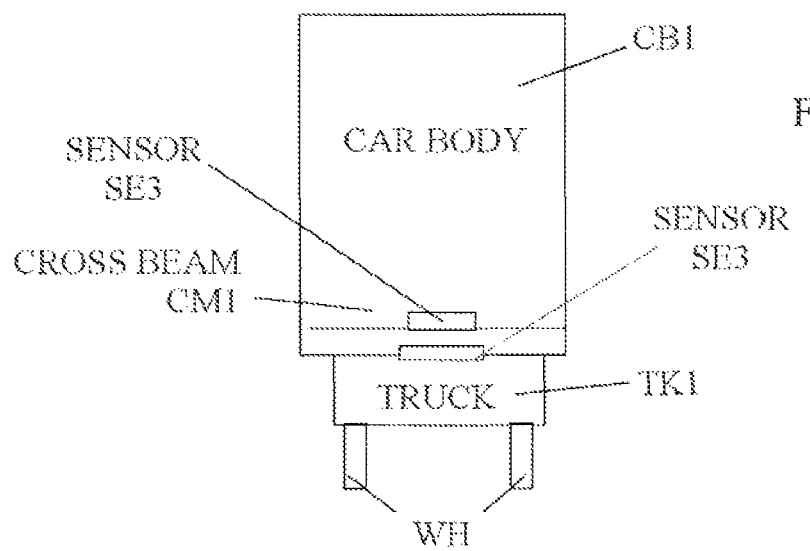
FIG. 9 is a schematic illustration of an embodiment of the invention showing a rear section of a car body containing a sensor.

The embodiment of the invention in FIG. 9 illustrates a rear sectional view of a rail car RC1 wherein a sensor SE3, identical to the sensors SE1 and SE2, is mounted on a crossbeam CM1 of a car body CB1 above a truck TK1 to respond to the weight of the car body.

Figure 10:
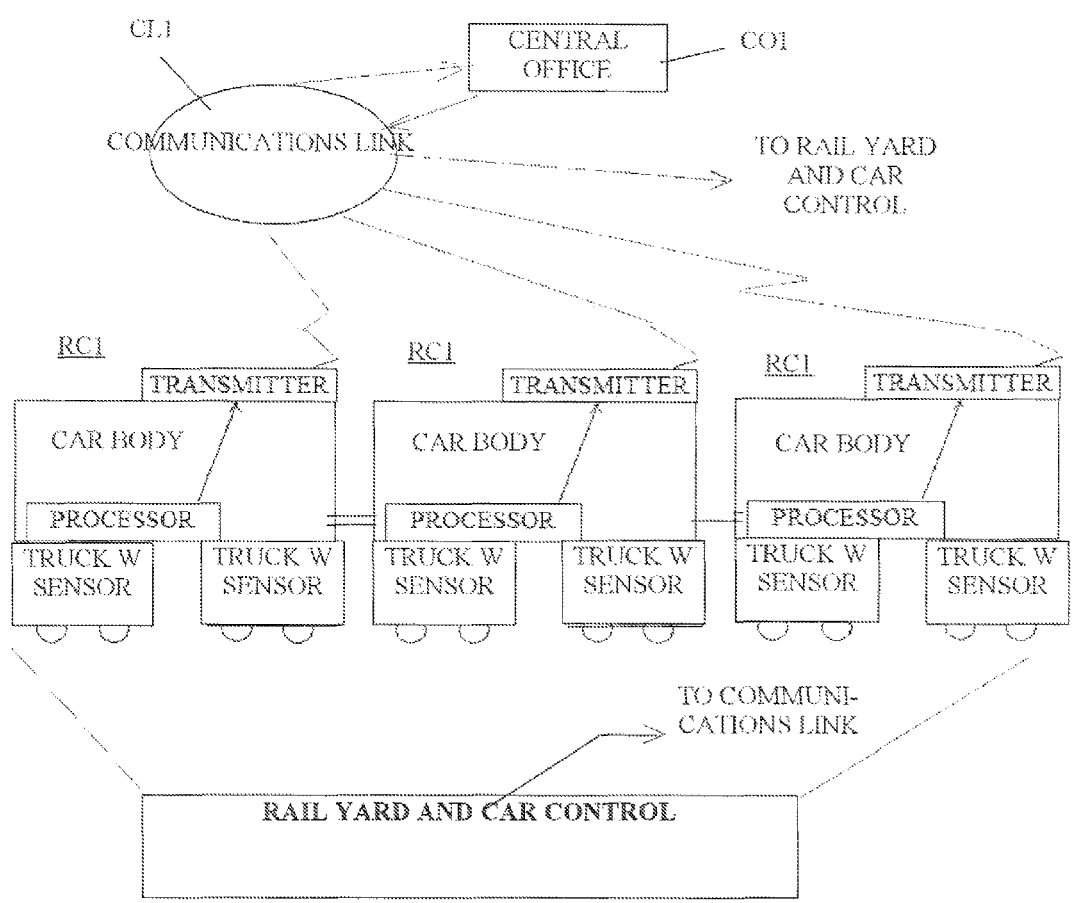
FIG. 10 is a schematic illustration of an embodiment of the invention showing train or rail cars and a rail yard to control the cars in response to feedback from a central office.

The embodiment of the invention in FIG. 10 illustrates a system in which a train of rail cars having sensor transmits information via the communications link CL1 to a central office CO1, and the latter feeds the data back to a rail yard RY1. The rail yard RY1 then utilizes the information to determine the routing of each rail car of the entire train, or the size or number of locomotives to hauling the train, or if a leaks or other reasons have caused and rail car to lose weight, or any combination of these effects. An automatic control, such as one in an unmanned train, then proceeds to take correct action, if needed.

In one embodiment of the invention, a cable connects the outputs of the sensors SE1, SE2, and SE3 to the processor PR1. In another embodiment, as shown in FIG. 11, the sensors SE1, SE2, and SE3 include both the sensing element ST1 and a microprocessor MP1. The latter communicates the data from the sensing element ST1 to the processor PR1 or directly to the communications link CL1.

Another embodiment of the invention concerns a tank car. A "tank car" is essentially a large transport tank built into a rail-car structure that is used to haul liquids of various types. In a tank car, the liquid will flow to a neutral, level position and, on a level surface, will effectively ensure that the weight within the car is very evenly distributed. In this special case, it can be assumed that each bolster will be supporting exactly (effectively) ½ of the load weight of the lading (i.e. the liquid in the tank). Therefore, a tank car is a special case where it is necessary only to measure one holster (i.e. one end of the tank car) in order to accurately calculate the overall weight of the lading.

The accuracy of this measurement can be improved if a precise determination can be made of any angle (fore-aft or side-to-side) in the lay of the Lank car when the measurement is made. Thus, on level ground, with a car that is either empty or very evenly loaded, the each bolster supports ½ of the weight of the railcar.

Various embodiments of the invention utilize a number of devices for capturing the flex of the bolster BO1 as a function of weight, for example load cells, strain and stress gauges of various configurations all of which will work.

An embodiment of the invention utilizes "low-force" strain sensors. The most prevalent of these is known as a "vibrating wire" device. It has the advantage of requiring very little force to cause displacement that can be measured since the device works by stretching a wire, or relaxing a stretched wire, and measuring the change in mechanical oscillation frequency due to the increased tension. (Similar to plucking a guitar string and tightening up or loosening the tuning key.)

According to an embodiment of the invention the brackets BR1 are affixed to the bolster BO1 structure via epoxy or welding, and the sensor SE1 is easily added after the fact without special tools. Thus, a simple welding procedure fixes mounting plates to the holster. After cooling, the sensor SE1 is fitted and attached with simple tools (e.g. an allen key). After this, the sensor SE1 is ready for calibration and operation. Should the sensor SE1 fail, it can be easily replaced in the field with no special tools. Devices other than vibrating wire can be used. The key element is the use of a low-force sensor for capturing the minute movements inherent in the flex-under-load of the steel bolster.

The entire weight of the rail car body is suspended between the two steel bolsters. As load increases in the rail car, the flexure of the two bolsters increases and it is this minute flexure that is measured by the vibrating wire sensor.

In a like manner, according to an embodiment of the invention, additional sensors (either vibrating wire or other) can be placed in locations and used to determine that portion of minute movement of the bolster material that is the result of extraneous stresses in the steel bolster due to unrelated forces caused by draft gear, motion, etc., as against that portion of the minute movement which is the result of weight change of the rail car. The net result is a "stress" correction factor that can be used to significantly improve the accuracy and repeatability of the weight calculation arrived at by measuring the change in tension of the vibrating wire sensor.

According to an embodiment of the invention, an accelerometer (or similar sensor) serves to determine tilt (side-to-side or fore-and-aft) of the rail car and data captured by the microprocessor or processor. The microprocessor or processor can then, through trigonometric calculations, determine the net effect of the overall angle of the rail car in two dimensions, to further correct the readings from the vibrating sensors and null out that portion of the measurement due to the rail car being at an uneven stance.

According to an embodiment of the invention, the sensor SE1 rests at an off-center position on the bolster BO1. According to an embodiment of the invention, the sensor SE1 appears astride the line 3-3 in FIG. 2. According to an embodiment of the invention, the sensor SE1 is mounted on the bottom of the bolster BO1. According to an embodiment of the invention, the sensor SE1 appears on both the bottom and top of the bolster BO1. According to an embodiment of the invention, the sensor SE1 is mounted on one or both side arms SA1. According to an embodiment of the invention, the sensor SE1 is mounted on the car body. According to an embodiment of the invention, sensors SE1 are mounted on all these positions and the information from each is included in calculating the weight.

The invention overcomes the cost incurred in moving a railcar to a weigh bridge. The latter weighs the entire railcar, including wheels, trucks, bolsters, etc. i.e. all "dead weight" on the railcar structure is included in the measurement. A typical tank car will weigh about 80,000 lbs empty and 180,000 full. Thus the lading will account for 100,000 lbs. A weigh bridge will weigh the entire railcar structure, including wheels, trucks, lading, and railcar body. Thus, if a weigh bridge had an accuracy of 1%, but only 100,000 lbs is actually the lading, then the true accuracy of the system would be 180,000/100,000*1% or 1.8%.

By contrast, the present invention (which involves sensors permanently mounted on the railcar) eliminates from consideration all weight associated with the trucks and bolsters, which can exceed 15,000 of the empty car weight of 80,000 lbs.

In addition to accuracy, the invention furnishes the much-valued repeatability. Whereas accuracy is an absolute function and must hold over time, temperature, etc., repeatability is a relative function. The invention is based on the recognition that it is easier for a measurement system to discern a difference in two measurements taken one hour apart than it is for the same system to discern a difference in measurements taken 2 months apart. The embodiments of the car-mounted measurement system have significant security capability. They are capable of discerning a very small change in weight on an hourly basis—much more precisely than it could discern a change in weight on a monthly basis. Should there be a leak or unauthorized discharge of a tank car, the change of weight would become noticeable very quickly even though less than 1% of the cargo was discharged. (1% being about 1,000 lbs of liquid from a 100,000 lb tank car. At 8 lbs per gallon—the specific gravity of water for example, 1,000 lbs equals about 125 gallons of material. This is significant if the material is anhydrous hydrochloric acid, for example.)

The embodiments of the invention provide determination of empty load status. Given proper calibration, the embodiments have the ability to accurately determine that a tank car has been fully unloaded. They overcome the common problem that tank cars are often not completely unloaded and are returned to the owners from the end-use customers with substantial product left in them. (This is known as a "heel".) This used product must be emptied and properly disposed of by the producer before the car is reloaded as there is no way of knowing if has been contaminated in the transport process.

This system for weighing the rail car bodies permits a rail dispatch center to determine the minimum size and number of locomotives a rail dispatcher can or must utilize to pull a train of rail cars. It also informs a company that owns the product on a fleet of widely and remotely distributed rail cars how much of its inventory is loaded on rail cars. This may become particularly important for a chemical company if rail cars are carrying a substantial portion of its solid or liquid inventory. The company's factory can adjust its output on the basis of this data.

Another embodiment of the invention increases the accuracy of the weight measurements for purposes of billing an end user of the product, or transferring custody to the end user. This appears in FIG. 12 showing a sensor SE1 and a temperature sensor TS1 on the bolster BO1. According to this embodiment, the temperature sensor TS1 determines the temperature of the bolster BO1 and adjusts the weight on the basis of this temperature measurement. A bolster BO1 spans the width of the railcar (approximately 10 feet) and can weigh over a thousand pounds. The adjustment modifies the weight indication as the steel bolster structure heats and cools (during night and day for example) and the steel expands and contracts. This adjustment surmounts the effects of expansion or contraction of the surface of the bolster due to loading. In an embodiment of this invention, a temperature profile is captured and used to correct for the thermal expansion of the steel. A similar adjustment can be made wherever the sensor is mounted to measure weight.

The embodiment mitigates other factors that can cause minute change in the bolster dimensions include change in temperature (which causes expansion and/or contraction of the steel bolster material) and extraneous strain (such as that which occurs when the rail care is pulled in train, or is otherwise under force.

According to the embodiment of the invention, a temperature sensor TS1 is attached within the base of a vibrating wire sensor, or other sensor, or attached to the bolster BO1 itself. In this manner, the temperature sensor TS1 is able to accurately measure the temperature of the bolster BO1. In one embodiment a data base of test temperatures at increments is recorded in the processor PR1 and the effects of temperatures tested against incremental weights. The processor PR1 then captures and stores this temperature and uses a historic recording of this temperature and automatically calculates a correction factor which determines that portion of minute movement of the bolster material that is the result of temperature change as against that portion of the minute movement which is the result of weight change of the rail car.

The embodiments without a temperature sensor provide the accuracy needed for establishing the size and number or locomotives needed, for indicating inventory, and determining factory output based on inventory. The "temperature" correction factor, in measuring the change in tension of the vibrating wire sensor, increases the accuracy and repeatability. Such increase in accuracy and repeatability may be desired for use in custody transfer and billing.

The embodiments of the invention have the advantage of mounting sensing elements on the railcar structure. The vibrating sensor requires very little force and can be screwed on brackets and yet produce results of great accuracy without calibration.

Further embodiments of the invention involve:

A load cell or sensor for capturing the weight of railcar components, including the railcar containment and the lading being transported by the railcar.

A vibrating wire sensor to capture flexing of critical railcar components, which may be translated into accurate measurement of railcar component, and lading weight.

A low-force sensor (such as a vibrating wire sensor) to capture flexing of critical railcar components, which may be translated into accurate measurement of railcar component, and lading weight.

Temperature correction to compensate for the effects of temperature on expansion/contraction of railcar structural members when calculating the weight of railcar components and lading.

Non-critical stress and/or strain sensing elements for purposes of measuring movement of railcar components and weight of railcar components and lading.

User-removable stress and/or strain and/or load sensors for purposes of measuring movement of railcar components and weight of railcar components and lading.

A wireless network for communicating data from various sensors to a central processor on a railcar platform.

A vibrating wire sensor on railcar for purposes of measuring movement of railcar components and weight of railcar components and lading.

A non-stressed load and/or stress and/or strain measuring device on a railcar component for purposes of measuring movement of railcar components and weight of railcar components and lading.

Calculating the total weight of any railcar by measuring only one end of the railcar.

Calculating the precise total weight of the lading in a tank car by measuring bolster deflection at only one end of the car.

A low-force transducer (such as a vibrating wire device) on a railcar bolster by utilizing a separate mounting bracket that may be attached separately from the sensing device itself.

Powering a sensing device as described by renewable power including solar, vibration, or wind energy.

Determining an authorized or unauthorized discharge or leak from a loaded railcar car by accurately capturing a change in weight over an established period of time.

Determining the load state (from fully loaded to fully unloaded) of a railcar.

Ensuring that a railcar has been fully unloaded and does not contain significant unused material as it is returned to its owner for refilling.

While embodiments have been described in detail, it will be evident to those skilled in the art that the invention can be embodied otherwise without departing from its scope.

What is claimed is:

1. A system, comprising:
   a railcar body weight sensor mounted on a flexible load bearing member of a railcar body or a truck arrangement of a railcar;
   a transmitter coupled to said sensor for transmitting a signal representing the output of said sensor; and
   a database comprising sensor readings for a series of repeatedly added known incremental weights to a car body;
   wherein:
   the railcar has a support pad between a car body and said truck arrangement;
   said car body rests on said support pad and is horizontally swivelable about an axis through the support pad;
   said sensor is a stress/strain gauge mounted on one of said flexible members outside of said support pad that measures stress/strain based on the deformation of the flexible member upon which it is mounted and located exclusively a) offset from the axis, and b) on one side of the axis; and
   said sensor output indicates a load within the railcar body utilizing data within the database.

2. A system as in claim 1, wherein:
   said flexible load bearing member comprises a flexible component that flexes in response to the weight of the car body; and
   said sensor is mounted on said component and produces an output in response to the flexure of said component as a measure of the weight of the car body.

3. system as in claim 2, wherein the sensor is one of a longitudinal strain gage and a longitudinally extending vibrating wire sensor to capture flexing of said component.

4. A system as in claim 1, wherein:
   a temperature detector mounted on said member and coupled to said transmitter measures the temperature; and
   said transmitter adjusts the signal representing the output of said sensor on the basis of the output of the temperature detector.

5. A system as in claim 1, wherein:
   a temperature detector mounted on said member and coupled to said transmitter measures the temperature;
   said transmitter adjusts the signal representing the output of said sensor on the basis of the output of the temperature detector, and based on at least one of a current temperature, rate of change of temperature, and rate of change of rate of change of temperature.

6. A system as in claim 1, wherein said sensor is arranged to be user movable while the car body rests on said support pad of said truck arrangement.

7. A system as in claim 1, wherein said transmitter is part of a wireless network for communicating data from various sensors to a central processor on a railcar platform.

8. A system as in claim 1, wherein said sensor includes a pair of mounting brackets and a longitudinal vibrating sensing component.

9. A system as in claim 1, wherein said sensor includes a pair of mounting brackets and one of a non-stressed load measuring device, a stress measuring device, and a strain measuring device.

10. A system as in claim 1, wherein said sensor is mounted on said member at one end of the railcar for measuring the entire weight of the car.

11. A system as in claim 1, wherein said transmitter transmits data at regular intervals.

12. A system as in claim 1, wherein said sensor is in the form of a longitudinal element.

13. A system as in claim 1, wherein said sensor has two ends.

14. A system as in claim 1, wherein a communications link communicatively coupled to the transmitter communicates the signal from said transmitter to a central office.

15. A system as in claim 1, wherein said sensor is in the form of a longitudinal element having two ends, so that flexing of the member on which the sensor is mounted changes the length of the sensor.

16. A system as in claim 1, wherein:
said railcar includes said truck arrangement as a first truck arrangement with first coaxial wheels, and further includes a second truck arrangement having second coaxial wheels,
the system further comprising at least one of said car body and said second truck arrangement having a further flexible member subject to stress and strain,
said first and second truck arrangements being spaced longitudinally along said rail car body, the system further comprising second car-body weight sensor mounted on said further flexible member.

17. A system as in claim 1, wherein said sensor is one of a plurality of sensors mounted on a plurality of flexible members.

18. A system as in claim 1, wherein said flexible member on which said sensor is mounted is exposed for mounting or removal while said rail car rests on said truck arrangement.

19. A system as in claim 1, wherein said sensor is removably mounted on said railcar while said car body rests on said truck arrangement.

* * * * *